July 6, 1954
S. HAMBURG
2,682,951
FAN FOR COMBINE SEPARATORS
Filed Nov. 24, 1952
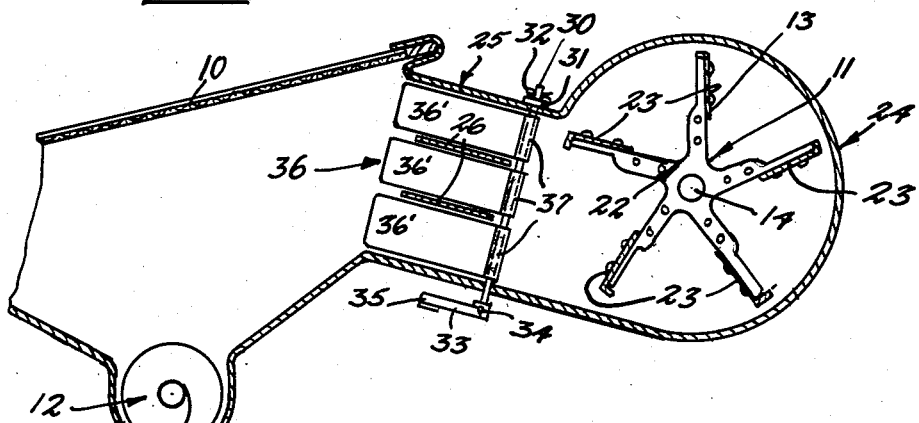
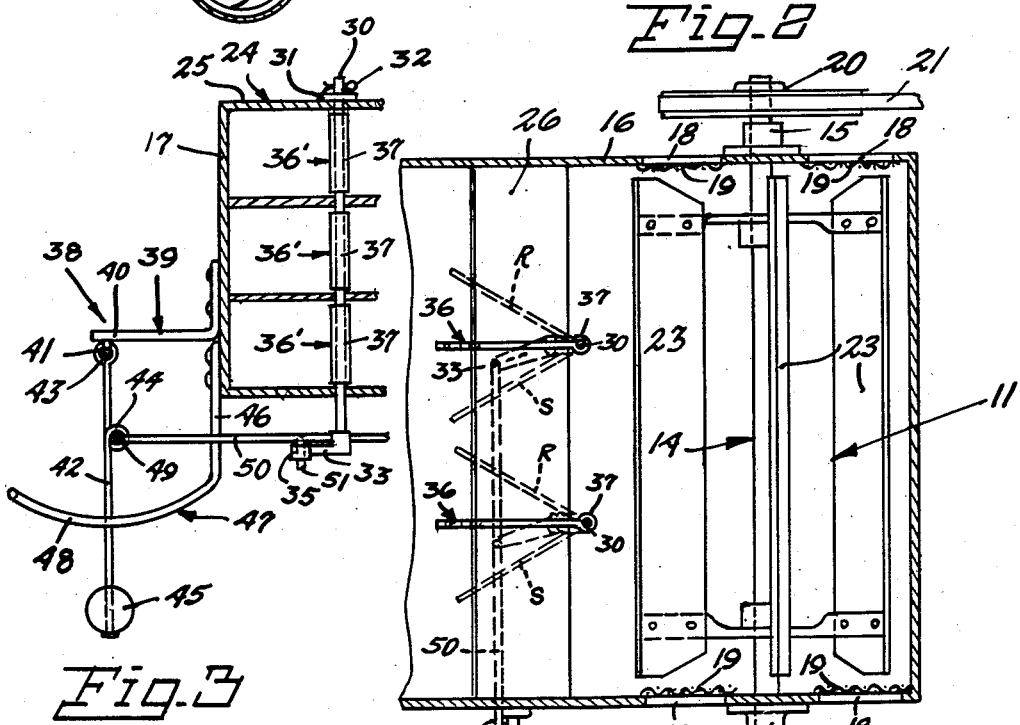
INVENTOR.
Samuel Hamburg
BY
Glenn L. Fish
ATTORNEY

Patented July 6, 1954

2,682,951

UNITED STATES PATENT OFFICE 2,682,951

FAN FOR COMBINE SEPARATORS

Samuel Hamburg, Odessa, Wash.

Application November 24, 1952, Serial No. 322,271

1 Claim. (Cl. 209—261)

This invention is an improved fan for the separator of a combine which is particularly adapted to deflect the air flow under the sieves of a separator toward the lower side of a transversely tilting combine.

One object of the invention is to provide deflectors in the mouth of a separator fan for directing the air flow in a combine.

Another object of the invention lies in the provision of an improved separator fan for a combine having vertical pivotally mounted deflectors operable by level-sensitive means, whereby the air flow is directed to the lower side of a tilting combine.

Another object of the invention is to generally improve the means of controlling air from a separator fan.

These and other objects of the invention will become apparent during the course of the following description.

In the accompanying drawings, forming a part of this specification, and in which like numerals are employed to designate like parts, Figure 1 is a fragmentary longitudinal cross section of a combine showing the separator fan and the sieve and related parts;

Figure 2 is a horizontal fragmentary cross section taken through the fan housing and showing the angularly adjustable deflectors; and Figure 3 is a vertical transverse fragmentary cross section illustrating the level-sensitive actuating means as associated with the deflectors.

Referring now more particularly to the drawings, I have shown a portion of a conventional combine which has one sieve 10, and it will be understood that any number of sieves desired may be employed, the sieve being disposed in position to receive air from the separator fan 11 by means of which the light chaff is separated from the heavier grain and blown rearwardly from the machine while the grain drops through the sieve and is carried away by the auger 12.

The fan 11 is of the squirrel-cage type and has a bladed rotor 13 carried on a transverse shaft 14 rotatably supported in bearings 15 mounted on the fan housing side walls 16 and 17. The side walls of the fan housing are provided with air ingress openings 18 and suitable screening means as 19 are applied in covering relation thereto to preclude foreign objects from entering the fan and yet permitting ample air ingress.

The shaft 14 has one end extending beyond its bearing 15 and a pulley or sprocket 20 is fixedly united therewith and rotary motion from a source not shown is imparted to the pulley 20 by means of a belt or chain 21, thus rotating the shaft 14 in a clockwise direction as viewed in Figure 1. Spiders 22 are secured to the shaft 14 and carry fan blades 23 extending parallel with the shaft 14 and transversely of the separator.

The housing 24 of the fan has a rectangular mouth 25 which forms an air egress opening. Vertically spaced substantially horizontal wind boards 26 extend transversely of the mouth and secure to the side walls 16 and 17 of the fan housing to direct the air flow from the mouth at a slight upward angle onto the bottom face of the sieve 10.

Thus far the description has been primarily concerned with well-known and previously used mechanics in a combine. Combines also are frequently provided with a levelling device which is quite expensive and adapted to maintain the body of the combine, and thus its operator, in a transverse horizontal position. This is for the purpose of distributing the grain evenly over the sieve 10 so that the air received from the fan 11 will properly separate the chaff from the grain. However, it has been found that the levelling devices do not always work as adequately as desired, and also because of their cost, a less expensive way of insuring proper separation is desirable. Therefore, I have devised this means of deflecting the air received from the fan to the lowermost side of the sieve when the separator is tilted transversely, where obviously the greater portion of grain and chaff will collect. This increases the air flow at the areas where most needed and adequately separates the chaff and grain when the separator is tilted.

To accomplish this, I have provided spaced vertical rods 30 which extend through the mouth 25 intermediate the fan 11 and wind boards 26 and are pivotally carried in the upper and lower walls of the mouth 25. The upper end of each rod is provided with a washer 31 and a cotter key 32 extends through an aperture in the rod to support the rod against downward longitudinal movement through the housing. The lower end of the rod is provided with a movable bell crank 33 which is secured by set bolt 34 and has at its outer free end a vertically disposed sleeve 35.

Vertically disposed deflectors 36 are provided in the mouth 25 and their planes are normally aligned with the flow of air through the mouth. The deflectors are formed in segments 36' one intermediate the wind boards 26 and others above and below said wind boards. At their inner edges the deflector segments 36' are provided with sleeves 37 which encircle the rods 30 and fix the deflectors onto the rods. Since the deflectors are in segments, the segments may be offset one from the other as indicated by dotted lines in Figure 2, say with the upper and lower segments in the position indicated by dotted line R and the intermediate segments in the position indicated by the dotted line S. Thus the greater quantity of the air from the fan will be deflected to the lower side of the tilted machine, and still a quantity will be deflected by the intermediate segment 36' to the upper side of the machine where there is still a portion of the wheat which has to be separated even though a greater portion is on the lower side.

Of course, the relative positions R and S are greatly exaggerated and it has been found that these positions in actual practice will be at a much more acute angle relative to each other, so that when the separator is greatly tilted, all of the segments 36' will be on the R side deflecting air toward the lower side, some to a greater amount than others. This has a great advantage over a single blade deflector which cannot be adjusted because then it is found that the threshed grain which passes onto the sieve at the upper side does not have sufficient air volume to support the chaff, and this falls down plugging the holes through the sieve making the separation ineffectual in that portion of the sieve causing more grain to flow diagonally of the sieve to the lower side where the quantity may be liable to plug the sieve entirely.

To pivot the deflectors in direct proportion to the degree of transverse tilt of the separator, I have provided a pendulum device 38. The pendulum comprises a bracket 39 supported on a side wall of the housing 24 and the bracket has a horizontally extending arm 40 which carries a depending eye 41. A pendulum rod 42 is formed of a metal rod and has an eye 43 bent at its upper end and engaged in the eye 41 of the bracket, wherewith the pendulum rod is pivotally supported, and intermediate the ends of the rod 42 a second eye 44 is formed in the rod by bending and at the lower end the rod is provided with a weight 45. Also secured to a wall of the housing 24 is a depending arm 46 which terminates at its lower end in a horizontally extending downwardly arcuate loop 47, having segments 48 one on each side of the pendulum rod 42, therefore confining the rod against longitudinal swinging by permitting transverse swinging therebetween. Engaged with the eye 44 is an eye 49 formed on the end of a transversely extending reciprocable rod 50 which has spaced depending fingers 51 extending downwardly through the sleeves 35. Therefore, as the separator tilts transversely to the right, as viewed in Figure 3, the pendulum 38 will swing inwardly toward the separator and shift eyed rod 50 to the right pivoting rods 30 and shifting the deflectors 36 toward the position R. The greater the degree of tilt, the farther the deflectors 36 are pivoted. Pivotal movement in the opposite direction is caused by transverse tilting movement to the left.

Having thus described my invention, I claim:

A fan for the separator of a combine comprising a fan housing having a powered rotary fan rotatably carried therein, an air discharge mouth rectangular in cross section communicating the housing with the separator and having its greatest transverse dimension disposed horizontally, vertically spaced transversely extending wind boards in the mouth and anchored on the end walls thereof, vertically disposed transversely spaced rods extending through said mouth intermediate the wind boards and fan and bearinged in the upper and lower walls of said mouth, means on the upper ends of said rods for supporting the rods against downward axial movement, bell cranks releasably secured to the lower ends of said rods and each having a vertically disposed sleeve on its outer end, a transversely extending reciprocable rod having an eye at its outer end and extending below the mouth, spaced depending fingers carried by the eyed rod and extending through said sleeves, whereby transverse longitudinal movement of the eyed rod imparts rotary motion to said vertical rods, vertically spaced longitudinally extending vertical deflectors, vertical sleeves on the deflectors and encircling the vertical rods for rigidly uniting the deflectors and said vertical rods, a depending arm secured to the housing, an outwardly extending downwardly arcuate loop carried by said arm, a bracket carried by the housing above said arm and having an outwardly extending horizontal arm terminating midway the length of said loop and spaced vertically thereabove, an eye carried by the outer end of said horizontal arm, a rod bent to form an eye at its upper end engaged in said arm-supported eye and having a second eye intermediate its length and engaged in said first named eye, and a weight on the lower end of said bent rod whereby the bent rod and weight comprise a pendulum adapted to shift the eyed rod whereby the deflectors are angled relative to the longitudinal axis of the separator.

References Cited in the file of this patent

UNITED STATES PATENTS

| Number | Name | Date |
|--------|------|------|
| 620,358 | Reeves et al. | Feb. 28, 1899 |
| 2,611,487 | Stevenson | Sept. 23, 1952 |